(12) United States Patent
Liu

(10) Patent No.: US 12,575,576 B2
(45) Date of Patent: Mar. 17, 2026

(54) OVEN

(71) Applicant: Ximei Liu, Dongguan (CN)

(72) Inventor: Ximei Liu, Dongguan (CN)

( * ) Notice: Subject to any disclaimer, the term of this patent is extended or adjusted under 35 U.S.C. 154(b) by 428 days.

(21) Appl. No.: 18/132,608

(22) Filed: Apr. 10, 2023

(65) Prior Publication Data

US 2024/0268398 A1 Aug. 15, 2024

(30) Foreign Application Priority Data

Feb. 14, 2023 (CN) .......................... 202320230728.8

(51) Int. Cl.
| | |
|---|---|
| *A21B 1/40* | (2006.01) |
| *A21B 1/33* | (2006.01) |
| *A21B 3/02* | (2006.01) |
| *F23B 40/00* | (2006.01) |

(52) U.S. Cl.
CPC .................. *A21B 1/40* (2013.01); *A21B 1/33* (2013.01); *A21B 3/02* (2013.01); *F23B 40/00* (2013.01); *F23B 2700/013* (2013.01)

(58) Field of Classification Search
None
See application file for complete search history.

(56) References Cited

U.S. PATENT DOCUMENTS

| | | | | |
|---|---|---|---|---|
| 2007/0137503 A1* | 6/2007 | Traeger | .................. | A23B 4/052 |
| | | | | 99/482 |
| 2011/0155027 A1* | 6/2011 | Waldner | .................... | F23K 3/14 |
| | | | | 110/286 |
| 2016/0327263 A1* | 11/2016 | Traeger | ............... | A47J 37/0786 |

| | | | | |
|---|---|---|---|---|
| 2019/0282032 A1* | 9/2019 | Colston | ............... | A47J 37/0754 |
| 2019/0290064 A1* | 9/2019 | Colston | .................... | A47J 37/07 |
| 2019/0293295 A1* | 9/2019 | Colston | .................... | F24B 15/00 |
| 2021/0161160 A1* | 6/2021 | Norris | .................... | A23B 4/052 |
| 2022/0090790 A1* | 3/2022 | Hamilton | .................. | F24B 5/06 |
| 2023/0031340 A1* | 2/2023 | Dahle | ................. | A47J 37/0713 |

FOREIGN PATENT DOCUMENTS

| | | | | | |
|---|---|---|---|---|---|
| CA | 3128962 A1 * | 2/2022 | | ............... | A21B 1/44 |
| CN | 112690666 A | 4/2021 | | | |
| CN | 213486624 U | 6/2021 | | | |
| CN | 213488432 U | 6/2021 | | | |
| CN | 213963048 U | * | 8/2021 | | |
| CN | 215457411 U | * | 1/2022 | | |
| DE | 202022102089 U1 * | 5/2022 | | ............. | F24B 13/04 |
| KR | 102118564 B1 * | 6/2020 | | ............... | A21B 1/26 |

OTHER PUBLICATIONS

Extended European Search Report of European Patent Application No. 23164634.0 issued on Sep. 28, 2023.

* cited by examiner

*Primary Examiner* — Jorge A Pereiro

(57) ABSTRACT

Disclosed is an oven, applied for baking a pizza, including: a casing, a side cover, a driven panel, and a temperature sensor. The casing is provided with a baking tray, a combustion chamber and a feeding chamber, the baking tray is arranged on one side of the combustion chamber, the combustion chamber is communicated with the feeding chamber, the feeding chamber is provided with a feeding mechanism, and the feeding mechanism can transport a fuel into the combustion chamber. A lower end of the side cover is hinged with the casing. The driven panel is arranged on an outer wall of the casing, the driven panel is electrically connected to the feeding mechanism. The temperature sensor is arranged in the casing, the temperature sensor is electrically connected to the driven panel.

9 Claims, 7 Drawing Sheets

100

100

13

6

12

11

4

42

OVEN

CROSS-REFERENCE TO RELATED APPLICATIONS

This application claims priority to Chinese Patent Application No. 202320230728.8, filed on Feb. 14, 2023, the entire contents of which are incorporated herein by reference.

TECHNICAL FIELD

The present disclosure relates to the technical field of pizza baking equipment, and in particular to an oven.

BACKGROUND

To make a delicious pizza, a special pizza oven is needed. Pizza ovens are generally provided with electricity, gas, pellet fuel, etc. as heat sources, especially the pizza baked with the pellet fuel has a good natural flavor.

Existing ovens generally use pellet fuel as the heat source, the pizza is arranged on the baking tray, and the combustion chamber needs to continuously bake the pizza. Since the continuity of fuel combustion in the combustion chamber is related to the fuel supply, if the fuel in the combustion chamber is supplied in time, then the pizza on the baking tray can be continuously heated, and the pizza can be cooked within the specified time. However, when using the existing oven, it needs to observe the size of the fire and the temperature in the oven, then add the fuel, which makes the existing oven inconvenient to use.

SUMMARY

The main purpose of the present disclosure is to provide an oven, aiming to drive the feeding mechanism to transport the fuel according to the temperature in the oven, so as to improve the convenience of the oven and meet the continuous heating or baking of pizza in the oven.

In order to achieve the above object, the present disclosure provides an oven, which is used for baking pizza, including: a casing, a side cover, a driven panel, and a temperature sensor.

The casing is provided with a baking tray, a combustion chamber and a feeding chamber, the baking tray is arranged on one side of the combustion chamber, the combustion chamber is communicated with the feeding chamber, the feeding chamber is provided with a feeding mechanism, and the feeding mechanism can transport a fuel into the combustion chamber.

A lower end of the side cover is hinged with the casing, and the side cover can open or close the casing to place the pizza on the baking tray.

The driven panel is arranged on an outer wall of the casing, the driven panel is electrically connected to the feeding mechanism, and the feeding mechanism is driven by the driven panel.

The temperature sensor is arranged in the casing, the temperature sensor is electrically connected to the driven panel, the temperature sensor can monitor a temperature on the baking tray, and when the temperature monitored by the temperature sensor is lower than a preset value of the driven panel, the feeding mechanism is driven by the driven panel to transport the fuel.

In an embodiment, the casing includes a base, a locking buckle, a first casing and a second casing, the first casing is arranged on an upper end of the base to seal the combustion chamber, a lower end of the second casing is hinged to an end of the base, an upper end of the second casing is buckled with one end of the first casing through the locking buckle, the second casing is arranged on the an upper end of the feeding chamber, and another end of the first casing is connected to the side cover.

In an embodiment, the upper end of the first casing is provided with a top cover and an inspection opening, the top cover can open or close the inspection opening, the top cover is provided with a smoke vent and an adjustment plate, the adjustment plate is rotatably connected to the top cover, the adjustment plate is hollowed out, and the adjustment plate can adjust a size of the smoke vent; and the adjustment plate includes an adjustment rod, a turntable and a hollowed portion, a shape of the hollowed portion is identical to a shape of the smoke vent, the adjustment rod is connected to the turntable, the hollowed portion is arranged in the turntable, and the adjustment rod can rotate so that the hollowed portion is overlapped or partially overlapped with the smoke vent.

In an embodiment, the feeding mechanism includes a first motor, a feeding sleeve, a rotating shaft and a spiral member, one end of the rotating shaft is connected to an output shaft of the first motor, the spiral member is wound on an outer wall of the rotating shaft, both the rotating shaft and the spiral member are arranged in the feeding sleeve, and an outer wall of the spiral member is slidingly connected to an inner wall of the feeding sleeve; and the first motor can drive the rotating shaft to rotate clockwise to rotate the spiral member, and the spiral member can push the fuel to move toward the combustion chamber.

In an embodiment, the feeding mechanism further includes a feeding cover, the feeding sleeve is arranged in the feeding cover, the combustion chamber is arranged in the feeding cover, a side wall of the combustion chamber close to the feeding cover is provided with a plurality of ventilation holes, and an air outside the feeding cover enters into the combustion chamber through the plurality of ventilation holes;

a bottom of the feeding cover is provided with a first fan, the first fan is electrically connected to the driven panel, and the first fan can blow air into the combustion chamber; and the first motor is also connected to a second fan, and an air outlet of the first fan is intersected with an air outlet of the second fan.

In an embodiment, the feeding sleeve is provided with a feeding inlet and a discharge outlet, the feeding inlet is arranged at an upper end of the feeding sleeve, the discharge outlet is arranged at the end of the feeding sleeve, and the feeding sleeve is communicated with the combustion chamber through the discharge outlet.

In an embodiment, an igniter is provided at the lower end of the feeding sleeve, one end of the igniter is electrically connected to the driven panel, another end of the igniter is arranged in the combustion chamber, and the igniter can ignite the fuel in the combustion chamber.

In an embodiment, a second motor is provided at a lower end of the baking tray, the second motor is electrically connected to the driven panel, an output shaft of the second motor is connected to the baking tray, the output shaft of the second motor is arranged at a center of the baking tray, and the second motor can drive the baking tray to rotate clockwise or counterclockwise.

In an embodiment, a fire baffle is provided at an upper end of the combustion chamber, the fire baffle is arranged between the baking tray and the combustion chamber, and the fire baffle can shield a fire of the combustion chamber.

In an embodiment, the side cover is provided with a viewing window and a handle, the handle is arranged at an upper end of the viewing window, and the viewing window is made of a transparent material.

In the technical solution of the present disclosure, the casing is provided with a baking tray, a combustion chamber and a feeding chamber, the baking tray is arranged on one side of the combustion chamber, and the combustion chamber is connected to the feeding chamber. The feeding chamber is provided with a feeding mechanism, and the feeding mechanism is configured to transport the fuel to the combustion chamber. The feeding mechanism transports the fuel to the combustion chamber for combustion, and the high temperature generated by the fuel in the combustion chamber is configured to bake the pizza on the baking tray. The lower end of the side cover is hinged with the casing, and the side cover is configured to open or close the casing so that the pizza can be placed on the baking tray. The driven panel is mounted on the outer wall of the casing, electrically connected to the feeding mechanism, and is configured to drive the feeding mechanism. The temperature sensor is arranged in the casing, electrically connected to the driven panel, and is configured to monitor the temperature on the baking tray. When the temperature monitored by the temperature sensor is lower than the preset value of the driven panel, the driven panel drives the feeding mechanism to transport the fuel. The feeding mechanism is driven by the driven panel to transport the fuel, the temperature sensor is electrically connected to the driven panel, and the temperature sensor is configured to monitor the temperature on the baking tray. When the temperature on the baking tray is lower than the needed temperature for baking the pizza, and lower than the preset value of the driven panel, the feeding mechanism can be driven to automatically transport the fuel to the combustion chamber by the driven panel, so that the fuel can be supplied to the combustion chamber in time, and the combustion chamber can continuously heat and bake the pizza, which improves the convenience of the oven and meets the requirements of continuous heating of the oven or the baking of the pizza.

BRIEF DESCRIPTION OF THE DRAWINGS

In order to illustrate the technical solutions in the embodiments of the present disclosure or in the related art more clearly, the following briefly introduces the accompanying drawings required for the description of the embodiments or the prior art. Obviously, the drawings in the following description are only part of embodiments of the present disclosure. For those of ordinary skill in the art, other drawings can also be obtained according to the structures shown in these drawings without any creative effort.

The achievement of the purpose of the present disclosure, functional characteristics and advantages will be further described with reference to the accompanying drawings in conjunction with embodiments.

DETAILED DESCRIPTION OF THE EMBODIMENTS

The technical solutions of the embodiments of the present disclosure will be described in more detail below with reference to the accompanying drawings. It is obvious that the embodiments to be described are only some rather than all of the embodiments of the present disclosure. All other embodiments obtained by persons skilled in the art based on the embodiments of the present disclosure without creative efforts shall fall within the scope of the present disclosure.

It should be noted that if there are directional indications, such as up, down, left, right, front, back, etc., involved in the embodiments of the present disclosure, the directional indications are only configured to explain a certain posture as shown in the accompanying drawings. If the specific posture changes, the directional indication also changes accordingly.

In addition, if there are descriptions related to "first", "second", etc. in the embodiments of the present disclosure, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the disclosure includes three parallel scenarios. For example, "A and/or B" includes only A, or only B, or both A and B. In addition, the technical solutions between the various embodiments can be combined with each other, but must be based on the realization by those of ordinary skill in the art. When the combination of technical solutions is contradictory or cannot be realized, it should be considered that the combination of such technical solutions does not exist or fall within the scope of protection claimed in this disclosure.

Figure 1:
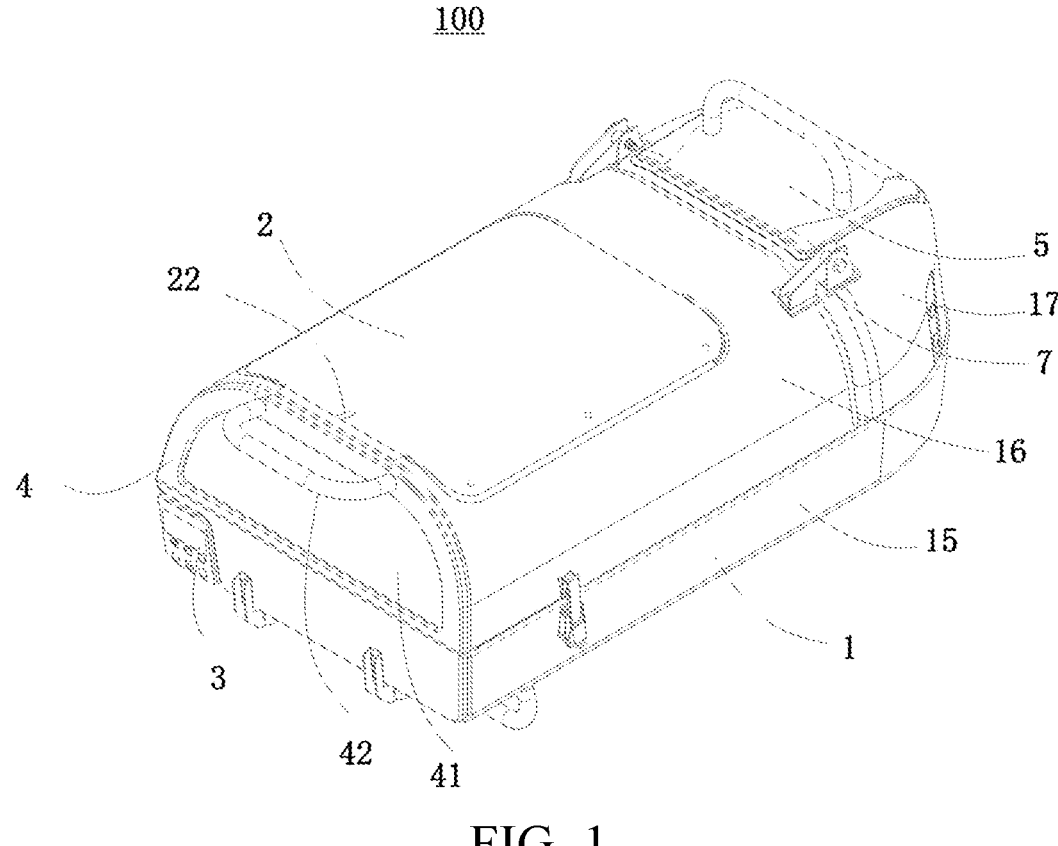
FIG. 1 is a first schematic view of an oven according to an embodiment of the present disclosure.
Figure 2:
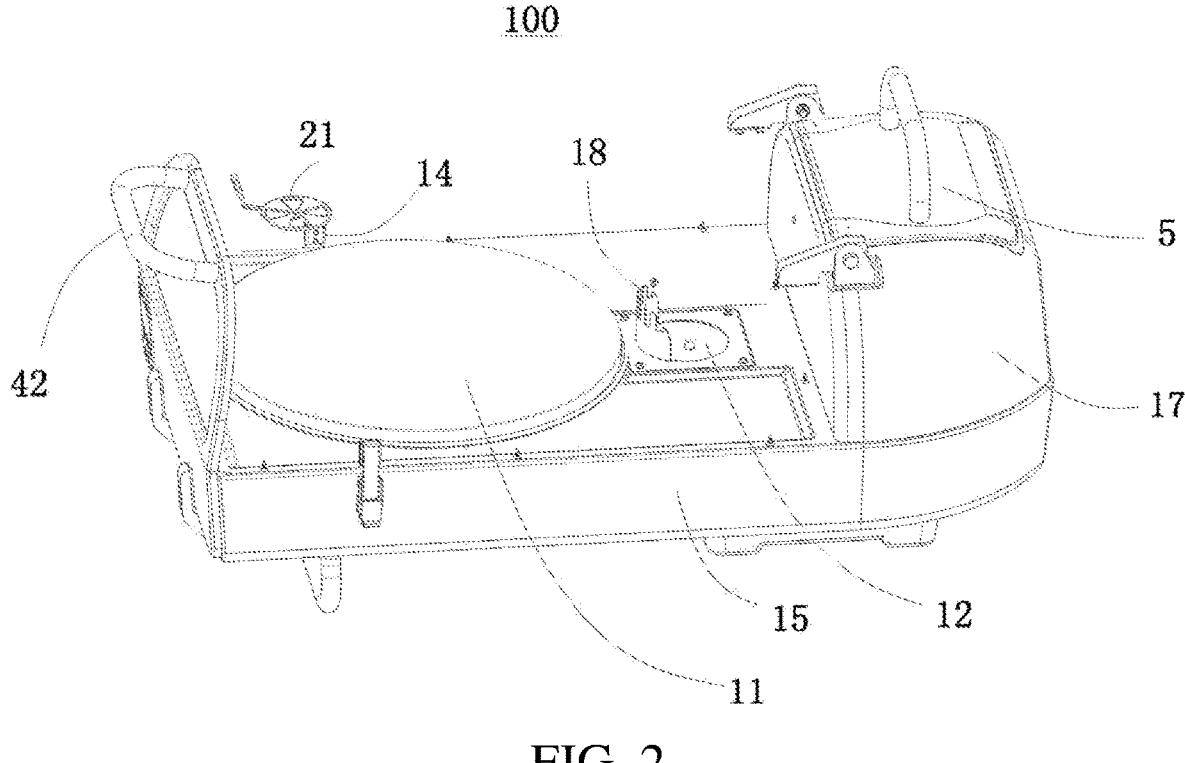
FIG. 2 is a second schematic view of the oven according to an embodiment of the present disclosure.
Figure 3:
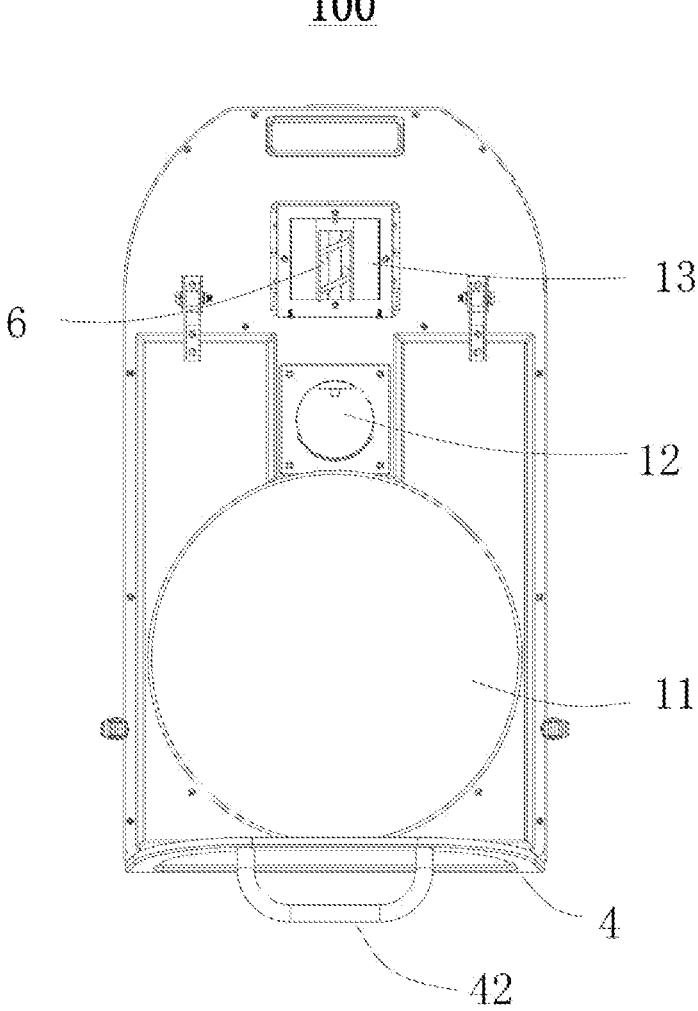
FIG. 3 is a top view of an oven according to an embodiment of the present disclosure.
Figure 4:
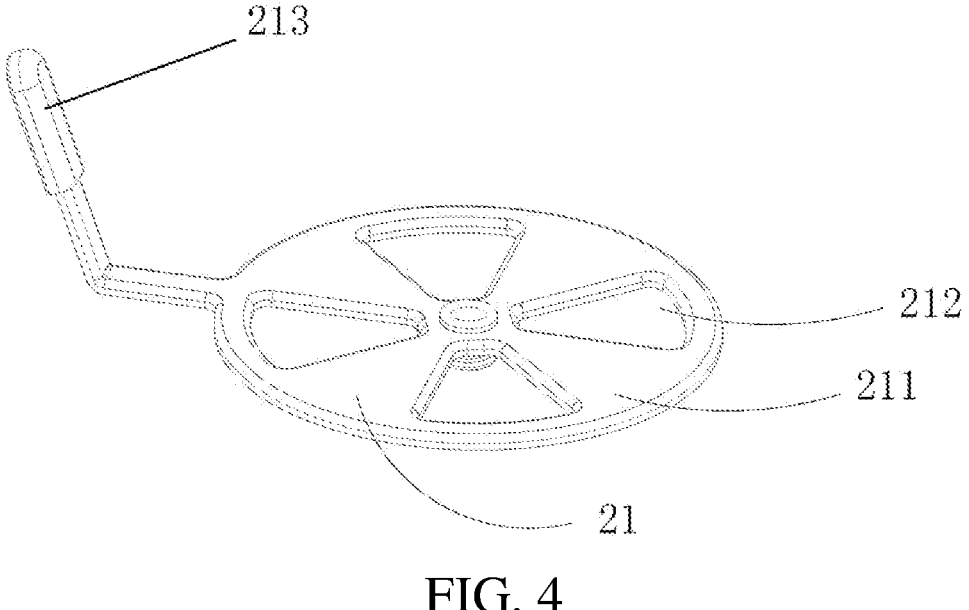
FIG. 4 is a schematic view of a turntable of an oven according to an embodiment of the present disclosure.
Figure 5:
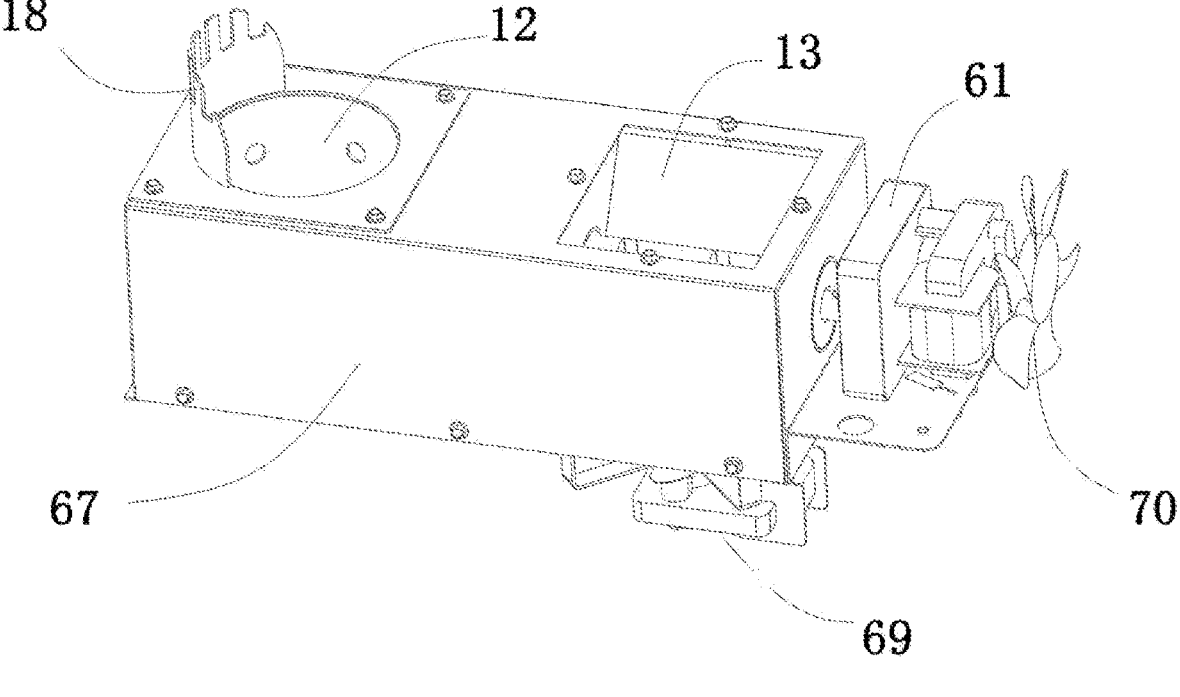
FIG. 5 is a schematic view of a feeding cover of an oven according to an embodiment of the present disclosure.
Figure 6:
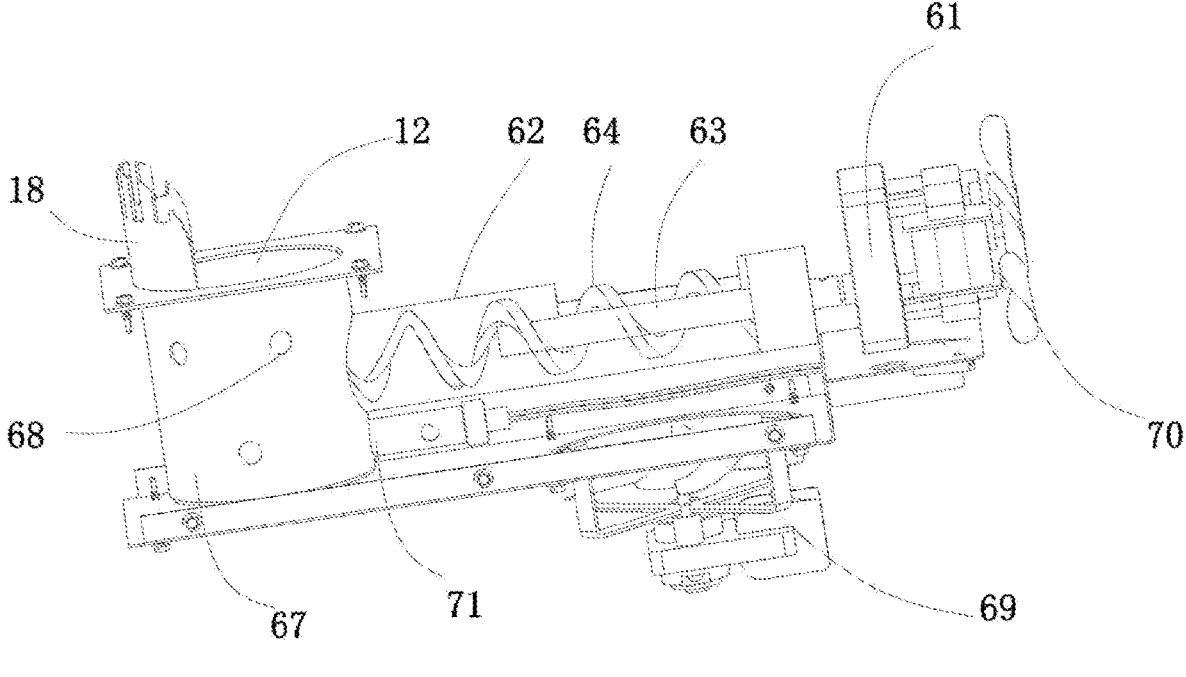
FIG. 6 is a first schematic view of a feeding mechanism of an oven according to an embodiment of the present disclosure.
Figure 7:
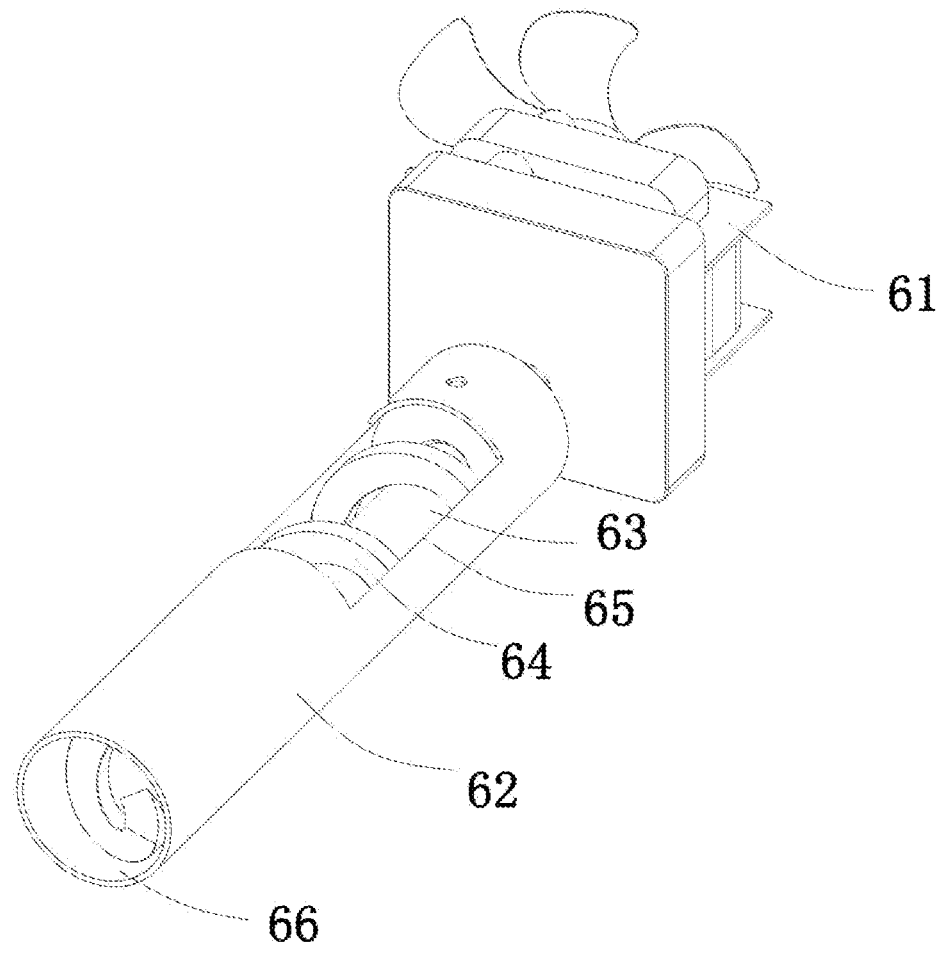
FIG. 7 is a second schematic view of the feeding mechanism of an oven according to an embodiment of the present disclosure.

The present disclosure provides an oven 100. Referring to FIG. 1 to FIG. 7, in an embodiment of the present disclosure, the oven 100, which is used for baking pizza, includes: a casing 1, a side cover 4, a driven panel 3, and a temperature sensor 14.

The casing is provided with a baking tray 11, a combustion chamber 12 and a feeding chamber 13. The baking tray 11 is arranged at a side of the combustion chamber 12, the combustion chamber 12 is communicated with the feeding chamber 13, the feeding chamber 13 is provided with a feeding mechanism 6, and the feeding mechanism 6 is configured to transport a fuel into the combustion chamber 12.

A lower end of the side cover 4 is hinged with the casing 1, and the side cover 4 is configured to open or close the casing 1, so that the pizza is placed on the baking tray 11.

The driven panel 3 is installed on an outer wall of the casing 1, the driven panel 3 is electrically connected to the feeding mechanism 6, and the driven panel 3 is configured to drive the feeding mechanism 6 to transport the fuel.

The temperature sensor 14 is arranged in the casing 1, the temperature sensor 14 is electrically connected to the driven panel 3, and the temperature sensor 14 is configured to monitor a temperature on the baking tray 11. When the temperature monitored by the temperature sensor 14 is lower than a preset value of the driven panel 3, the driven panel 3 drives the feeding mechanism 6 to transport the fuel.

In this embodiment, an operating principle of the oven 100 is as follows: after the oven 100 is turned on, the driven panel 3 is configured to drive the feeding mechanism 6 to transport the fuel to the combustion chamber 12, the driven panel 3 drives the igniter 71 to ignite the fuel in the combustion chamber 12, the driven panel 3 drives the first fan 69 to rotate, and the first fan 69 blows an air near a feeding cover 67 to a ventilation hole 68, so that the combustion chamber 12 continuously receives an external air, and the fuel is constantly fully burned. After the fuel is completely transported, the driven panel 3 drives the feeding mechanism 6 to stop. The temperature sensor 14 is configured to monitor a temperature in the oven 100, and when a monitoring temperature of the temperature sensor 14 is lower than the preset value of the driven panel 3, the driven panel 3 drives the feeding mechanism 6 to transport fuel. The fuel is continuously sent into the combustion chamber 12 to ensure a continuous heating of the combustion chamber 12 to bake the pizza.

According to the technical solution of the present disclosure, the baking tray 11, the combustion chamber 12 and the feeding chamber 13 are arranged in the casing 1, the baking tray 11 is arranged on one side of the combustion chamber 12, and the combustion chamber 12 is communicated with the feeding chamber 13. The feeding chamber 13 is provided with the feeding mechanism 6, and the feeding mechanism 6 is configured to transport the fuel to the combustion chamber 12. The feeding mechanism 6 transports the fuel to the combustion chamber 12 for combustion, and a high temperature generated by the combustion chamber 12 is configured to bake the pizza on the baking tray 11. The lower end of the side cover 4 is hinged with the casing 1, and the side cover 4 is configured to open or close the casing 1 so that the pizza can be placed into the baking tray 11. The driven panel 3 is installed on the outer wall of the casing 1, electrically connected to the feeding mechanism 6, and is configured to drive the feeding mechanism 6 to transport the fuel. The temperature sensor 14 is arranged in the casing 1, electrically connected to the driven panel 3, and is configured to monitor the temperature on the baking tray 11. When the temperature monitored by the temperature sensor 14 is lower than the preset value of the driven panel 3, the driven panel 3 drives the feeding mechanism 6 to transport the fuel. The driven panel 3 is configured to drive the feeding mechanism 6 to transport the fuel, and the temperature sensor 14 is electrically connected to the driven panel 3. The temperature sensor 14 is configured to monitor the temperature on the baking tray 11, for example, the temperature on the baking tray 11 is lower than the temperature required for baking pizza, and is lower than the preset value of the driven panel 3, the driven panel 3 will drive the feeding mechanism 6 to automatically transport the fuel to the combustion chamber 12, so that the fuel can be sent into the combustion chamber 12 in time, and the combustion chamber 12 can continue to heat the oven to bake the pizza, which improves the convenience of the oven 100, and satisfies the continuous heating of the oven 100 or baking the pizza.

Specifically, the casing 1 includes a base 15, a locking buckle 7, a first casing 16 and a second casing 17, and the first casing 16 is installed on an upper end of the base 15 to seal the combustion chamber 12. The lower end of the second casing 17 is hinged to the end of the base 15, the upper end of the second casing 17 is buckled with one end of the first casing 16 through the locking buckle 7, and the second casing 17 is arranged at the upper end of the feeding chamber 13, another end of the first casing 16 is connected to the side cover 4. When it needs to clean up an ash in the combustion chamber 12 and the feeding chamber 13, the first casing 16 and the second casing 17 can be opened through the locking buckle 7, and the side cover 4 can be held to pour out the ash from the combustion chamber 12 and the feeding chamber 13, which further enhances the convenience of the oven 100.

Specifically, the upper end of the first casing is provided with a top cover 2 and an inspection opening, and the top cover 2 is configured to open or close the inspection opening. The top cover 2 is provided with a smoke vent 22 and an adjustment plate 21, the adjustment plate 21 is rotatably connected to the top cover 2, the adjustment plate 21 is hollowed out, and the adjustment plate 21 is configured to adjust a size of the smoke vent 22. The adjustment plate 21 includes an adjustment rod 213, a turntable 211 and a hollowed portion 212, a shape of the hollowed portion 212 is identical to the smoke vent 22, the adjustment rod 213 is connected to the turntable 211, the hollowed portion 212 is arranged in the turntable 211, and the adjustment rod 213 is configured to rotate, so that the hollowed portion 212 is overlapped or partially overlapped with the smoke vent 22. When the adjustment rod 213 moves, the turntable 211 rotates at the smoke vent 22, so that the hollowed portion 212 is overlapped or partially overlapped with the smoke vent 22. The more the hollowed portion 212 is overlapped with the smoke vent 22, the larger the smoke vent is, and the size of the smoke vent 22 can be adjusted.

In an embodiment, the feeding mechanism 6 includes a first motor 61, a feeding sleeve 62, a rotating shaft 63 and a spiral member 64, one end of the rotating shaft 63 is connected to an output shaft of the first motor 61, and the spiral member 64 is wound on an outer wall of the rotating shaft 63, the rotating shaft 63 and the spiral member 64 are arranged in the feeding sleeve 62, and the outer wall of the spiral member 64 is slidingly connected to the inner wall of the feeding sleeve 62. The first motor 61 is configured to drive the rotating shaft 63 to rotate clockwise to rotate the spiral member 64, and the spiral member 64 is configured to push the fuel to move toward the combustion chamber 12. Since the spiral member 64 is wound on the outer wall of the rotating shaft 63, the outer wall of the spiral member 64 is slidingly connected to the inner wall of the feeding sleeve 62, and the fuel is arranged at the bottom of the feeding sleeve 62, when the first motor 61 rotates clockwise, the spiral member 64 is driven to rotate clockwise by the rotating shaft 63. The spiral member 64 is in a helical shape, thereby continuously pushing the fuel to move toward the combustion chamber 12, and completing the transportation of the fuel. A structure of the feeding mechanism 6 made of the spiral member 64, the rotating shaft 63 and the feeding sleeve 62 is simple and the operation is convenient. Compared with a belt transmission, this transmission method is efficient and requires a relatively few parts. Moreover, in this embodiment, the fuel is in a granular form, which facilitates the feeding mechanism 6 to transport the fuel.

In an embodiment, the feeding mechanism 6 also includes a feeding cover 67, the feeding sleeve 62 is installed in the feeding cover 67, the combustion chamber 12 is arranged in the feeding cover 67, and the side wall of the combustion chamber 12 close to the feeding cover 67 is provided with a plurality of ventilation holes 68, and an air outside the feeding cover 67 enters into the combustion chamber 12 through the plurality of ventilation holes 68. A first fan 69 is provided at a bottom of the feeding cover 67, the first fan 69 is electrically connected to the driven panel 3, and the first fan 69 is configured to blow air into the combustion chamber 12. The driven panel 3 is configured to drive the first fan 69 to rotate, so that the air at the bottom of the feeding cover 67 flows rapidly. Since the side wall of the feeding cover 67 is sealed, the air will enter the combustion chamber 12 through the plurality of ventilation holes 68, thereby providing a constant fresh air containing oxygen into the combustion chamber 12, the fuel is burned fully after meeting oxygen. In this way, the ventilation hole 68 and the first fan 69 can make the fuel burned more fully, and ensure the temperature of the combustion chamber 12 is enough to bake the pizza.

The first motor 61 is also connected to a second fan 70, and the air outlet of the first fan 69 is intersected with an air outlet of the second fan 70. When the first motor 61 rotates, the first motor 61 can also drive the second fan 70 to rotate, and the air outlet of the first fan 69 is intersected with the air outlet of the second fan 70, so that the air in the feeding cover 67 flows continuously from multiple directions during an operation of the first fan 69 and the second fan 70. In this way, the air in the feeding cover 67 flows into the plurality of ventilation holes 68 from different directions, and enters into the combustion chamber 12. The second fan 70 is adopted to further accelerate the flow of the air the flow rate of the air, therefore, the second fan 70 is adopted to further make the fuel burned more fully.

In this embodiment, the second fan 70 can also dissipate a heat of the first motor 61, avoiding a temperature of the first motor 61 being too high during the continuous operation, and avoiding components being burned resulting from an over-temperature of the first motor 61. Therefore, the use of the second fan 70 can improve a service life of the feeding mechanism 6.

In an embodiment, the feeding sleeve 62 is provided with a feeding inlet 65 and a discharge outlet 66, the feeding inlet 65 is arranged at an upper end of the feeding sleeve 62, the discharge outlet 66 is arranged at an end of the feeding sleeve 62, and the feeding sleeve 62 is communicated with the combustion chamber 12 through the discharge outlet 66. The fuel enters the feeding sleeve 62 from the feeding inlet 65, and the spiral member 64 rotates and pushes the fuel to move toward the combustion chamber 12, so that the fuel in the feeding sleeve 62 is transported into the combustion chamber 12. In this embodiment, an upper end of the feeding chamber 13 is provided with a feeding cover 5, when the fuel needs to be added, the feeding cover 5 is opened to allow the fuel to enter the feeding sleeve 62 through the feeding inlet 65.

In an embodiment, a lower end of the feeding sleeve 62 is provided with an igniter 71, one end of the igniter 71 is electrically connected to the driven panel 3, another end of the igniter 71 is arranged in the combustion chamber 12, and the igniter 71 is configured to ignite the fuel in the combustion chamber 12. In this embodiment, the igniter 71 is a gas-free igniter. After the power is on, a heating wire of the igniter 71 generates the heat after being energized. When the heating wire is heated to a certain temperature, the particulate fuel can be ignited. After an ignition process is completed, the igniter 71 is driven to close by the driven panel 3. The igniter 71 can be purchased in a market and installed in the oven 100. The driven panel 3 is configured to drive the igniter 71 so that the igniter 71 ignites the fuel in the combustion chamber 12, which further improves the convenience of the oven 100.

In an embodiment, the lower end of the baking tray 11 is provided with a second motor, the second motor is electrically connected to the driven panel 3, and an output shaft of the second motor is connected to the baking tray 11, the output shaft of the second motor is arranged at the center of the baking tray 11, and the second motor is configured to drive the baking tray 11 to rotate clockwise or counterclockwise. The driven panel 3 can drive the second motor to rotate, so that the baking tray 11 rotates in the oven 100. Since a position of the combustion chamber 12 is fixed, a temperature above the combustion chamber 12 is a highest, and the baking tray 11 is arranged on one side of the combustion chamber 12. When the baking tray rotates, each position of the pizza can get close to the combustion chamber to get heated, so that the pizza on the baking tray 11 is evenly baked by the combustion chamber 12, which further improves the efficiency of baking the pizza and also avoids the pizza is heated unevenly and cannot be cooked.

In an embodiment, the upper end of the combustion chamber 12 is provided with a fire baffle 18, the fire baffle 18 is arranged between the baking tray 11 and the combustion chamber 12, and the fire baffle 18 is configured to block the fire from the combustion chamber 12. This fire baffle 18 can block the fire of combustion chamber 12, avoiding that the fire of combustion chamber 12 is too big and causes the pizza on the baking tray 11 overcooked. An upper end of the fire baffle 18 is in a shape of a ridge, which avoids the fire of the combustion chamber being completely blocked.

The side cover 4 is provided with a viewing window 41 and a handle 42, the handle 42 is arranged at an upper end of the viewing window 41, and the viewing window 41 is made of a transparent material. A baking situation on the baking tray 11 can be observed through the viewing window 41, and the side cover 4 can be opened conveniently through the handle 42, so that the pizza can be quickly put on the baking tray 11.

The above descriptions are only embodiments of the present disclosure, and are not intended to limit the scope of the present disclosure. Under the inventive concept of the present disclosure, any equivalent structural transformations made by using the contents of the description and drawings of the present disclosure, or direct/indirect disclosures in other related technical fields are included in the scope of the present disclosure.

What is claimed is:

1. An oven, applied for baking a pizza, comprising:
   a casing, wherein the casing is provided with a baking tray, a combustion chamber and a feeding chamber, the baking tray is arranged on one side of the combustion chamber, the combustion chamber is communicated with the feeding chamber, the feeding chamber is provided with a feeding mechanism, and the feeding mechanism is configured to transport a fuel into the combustion chamber;
   a side cover, wherein a lower end of the side cover is hinged with the casing, and the side cover is configured to open or close the casing to place the pizza on the baking tray;
   a driven panel, wherein the driven panel is arranged on an outer wall of the casing, the driven panel is electrically connected to the feeding mechanism, and the feeding mechanism is driven by the driven panel; and
   a temperature sensor, wherein the temperature sensor is arranged in the casing, the temperature sensor is electrically connected to the driven panel, the temperature sensor is configured to monitor a temperature on the baking tray, and when the temperature monitored by the temperature sensor is lower than a preset value of the driven panel, the feeding mechanism is driven by the driven panel to transport the fuel;

wherein the casing comprises a base, a locking buckle, a first casing and a second casing, the first casing is arranged on an upper end of the base to seal the combustion chamber, a lower end of the second casing is hinged to an end of the base, an upper end of the second casing is buckled with one end of the first casing through the locking buckle, the second casing is arranged on the an upper end of the feeding chamber, and another end of the first casing is connected to the side cover.

2. The oven of claim 1, wherein the upper end of the first casing is provided with a top cover and an inspection opening, the top cover is configured to open or close the inspection opening, the top cover is provided with a smoke vent and an adjustment plate, the adjustment plate is rotatably connected to the top cover, the adjustment plate is hollowed out, and the adjustment plate is configured to adjust a size of the smoke vent; and the adjustment plate comprises an adjustment rod, a turntable and a hollowed portion, a shape of the hollowed portion is identical to a shape of the smoke vent, the adjustment rod is connected to the turntable, the hollowed portion is arranged in the turntable, and the adjustment rod is configured to rotate so that the hollowed portion is overlapped or partially overlapped with the smoke vent.

3. The oven of claim 1, wherein the feeding mechanism comprises a first motor, a feeding sleeve, a rotating shaft and a spiral member, one end of the rotating shaft is connected to an output shaft of the first motor, the spiral member is wound on an outer wall of the rotating shaft, both the rotating shaft and the spiral member are arranged in the feeding sleeve, and an outer wall of the spiral member is slidingly connected to an inner wall of the feeding sleeve; and the first motor is configured to drive the rotating shaft to rotate clockwise to rotate the spiral member, and the spiral member is configured to push the fuel to move toward the combustion chamber.

4. The oven of claim 3, wherein the feeding mechanism further comprises a feeding cover, the feeding sleeve is arranged in the feeding cover, the combustion chamber is arranged in the feeding cover, a side wall of the combustion chamber close to the feeding cover is provided with a plurality of ventilation holes, and an air outside the feeding cover enters into the combustion chamber through the plurality of ventilation holes;

a bottom of the feeding cover is provided with a first fan, the first fan is electrically connected to the driven panel, and the first fan is configured to blow air into the combustion chamber; and the first motor is also connected to a second fan, and an air outlet of the first fan is intersected with an air outlet of the second fan.

5. The oven of claim 4, wherein the feeding sleeve is provided with a feeding inlet and a discharge outlet, the feeding inlet is arranged at an upper end of the feeding sleeve, the discharge outlet is arranged at the end of the feeding sleeve, and the feeding sleeve is communicated with the combustion chamber through the discharge outlet.

6. The oven of claim 5, wherein an igniter is provided at the lower end of the feeding sleeve, one end of the igniter is electrically connected to the driven panel, another end of the igniter is arranged in the combustion chamber, and the igniter is configured to ignite the fuel in the combustion chamber.

7. The oven of claim 6, wherein a second motor is provided at a lower end of the baking tray, the second motor is electrically connected to the driven panel, an output shaft of the second motor is connected to the baking tray, the output shaft of the second motor is arranged at a center of the baking tray, and the second motor is configured to drive the baking tray to rotate clockwise or counterclockwise.

8. The oven of claim 7, wherein a fire baffle is provided at an upper end of the combustion chamber, the fire baffle is arranged between the baking tray and the combustion chamber, and the fire baffle is configured to shield a fire of the combustion chamber.

9. The oven of claim 1, wherein the side cover is provided with a viewing window and a handle, the handle is arranged at an upper end of the viewing window, and the viewing window is made of a transparent material.

* * * * *